US008605664B2

(12) United States Patent
Eichinger et al.

(10) Patent No.: US 8,605,664 B2
(45) Date of Patent: Dec. 10, 2013

(54) ADAPTIVE MODULATION AND CODING IN A SC-FDMA SYSTEM

(75) Inventors: Josef Martin Eichinger, Neufinsing (DE); Yan Gao, San Jose, CA (US); Rüdiger Halfmann, Otterberg (DE); Thomas Haustein, München (DE); Bernard Raaf, Neuried (DE); Egon Schulz, München (DE); Wolfgang Zirwas, München (DE)

(73) Assignee: Nokia Siemens Networks GmbH & Co., KG, Munich (DE)

( * ) Notice: Subject to any disclaimer, the term of this patent is extended or adjusted under 35 U.S.C. 154(b) by 36 days.

(21) Appl. No.: 12/517,152

(22) PCT Filed: Nov. 22, 2007

(86) PCT No.: PCT/EP2007/010146
§ 371 (c)(1),
(2), (4) Date: Jul. 1, 2009

(87) PCT Pub. No.: WO2008/064819
PCT Pub. Date: Jun. 5, 2008

(65) Prior Publication Data
US 2010/0002575 A1 Jan. 7, 2010

(30) Foreign Application Priority Data
Nov. 30, 2006 (EP) .................... 06024811

(51) Int. Cl.
*H04W 4/00* (2009.01)
(52) U.S. Cl.
USPC ........... 370/329; 370/331; 370/330; 370/338; 370/345; 455/422.1; 455/412.1; 455/452.1
(58) Field of Classification Search
None
See application file for complete search history.

(56) References Cited

U.S. PATENT DOCUMENTS

2004/0196919 A1 10/2004 Mehta et al.
2006/0034164 A1* 2/2006 Ozluturk ...................... 370/208
(Continued)

FOREIGN PATENT DOCUMENTS

WO 2006120296 A1 11/2006

OTHER PUBLICATIONS

Kawamura et al., Comparisons of 16QAM Modulation Schemes Considering PAPR for Single-Carrier FDMA Radio Access in Evolved UTRA Uplink, 2006 IEEE Ninth International Symposium on Spread Spectrum Techniques and Applications, Aug. 2006, pp. 332-336, XP002428400.

(Continued)

*Primary Examiner* — Kibrom T Hailu
*Assistant Examiner* — Zewdu A Beyen
(74) *Attorney, Agent, or Firm* — Harrington & Smith

(57) ABSTRACT

A method and a system for transmitting data by a transmitter over a channel having a predetermined channel quality estimate, comprises the steps of splitting (S2P) input data stream (S40, S60, S80) to be transmitted into a plurality of data sub-streams (S40a, S40b, S40c); processing (SYM1, SYM2, SYMj) each of the plurality of data sub-streams (S40a, S40b, S40c) into a plurality of symbol subsets (S41, S42, S43) by selecting a certain scheme of coded-modulation (BPSK, QPSK, 16-QAM); processing, separately, each of the plurality of symbol subsets (S41, S42, S43), via a plurality of separate Discrete Fourier Transforms (DFT1, DFT2, DFT3), herein after denoted as DFTs, to obtain a plurality of DFT-precoded data sub-streams (S44, S45, S46); allocating each DFT-precoded data sub-stream (S44, S45, S46) in a frequency resource block (RB1, RB2, RB3), via a sub-carrier mapping module (SCM), so that for each data sub-stream (S40a, S40b, S40c) the selected scheme of coded-modulation (BPSK, QPSK, 16-QAM) is chosen in dependence of the values of the channel quality estimate at the frequencies of its own allocated frequency resource block (RB1, RB2, RB3).

24 Claims, 10 Drawing Sheets

(56) References Cited

U.S. PATENT DOCUMENTS

| | | |
|---|---|---|
| 2006/0251041 A1 | 11/2006 | Pajukoski et al. |
| 2007/0041404 A1* | 2/2007 | Palanki et al. ................ 370/479 |
| 2007/0109956 A1* | 5/2007 | Kwon et al. .................. 370/208 |
| 2008/0102440 A1* | 5/2008 | Parsons et al. .................... 435/4 |
| 2009/0316632 A1* | 12/2009 | Prakash ........................ 370/329 |

OTHER PUBLICATIONS

Wong et al., "Multiuser Subcarrier Allocation for OFDM Transmission using Adaptive Modulation" 1999, IEEE , pp. 479-483, XP-000899278.

* cited by examiner

ADAPTIVE MODULATION AND CODING IN A SC-FDMA SYSTEM

BACKGROUND OF THE INVENTION

Field of the Invention

The present invention relates to a method for transmitting data by a transmitter over a channel having a predetermined channel quality estimate, and a system for carrying out the method.

The invention relates to data transmission in telecommunications systems. The invention was developed with specific attention paid to its possible use in 3GPP mobile telecommunication systems.

Currently, in the Long Term Evolution (LTE) version of UMTS systems, the basic transmission scheme used for uplink transmission is SC-FDMA with cyclic prefix.

In general, the advantage of OFDM techniques compared to CDMA techniques, in the broadband regime of 5 to 20 MHz bandwidth, is that it is possible to adapt the Adaptive Modulation and Coding (AMC) scheme per sub-carrier or per groups of sub-carriers. In fact, in CDMA data symbols are spread over the whole spectrum and link adaptation can only be performed in an averaged sense over the entire spectrum, which therefore results in throughput degradation if the channel is very frequency selective, as for example in many outdoor scenarios.

In particular, a first advantage of the above mentioned SC-FDMA transmission scheme with cyclic prefix is that it allows achieving uplink inter-user orthogonality in frequency domain with a reduced peak to average power ratio (PAPR).

A second advantage of this transmission scheme is that it allows achieving efficient frequency-domain equalization at the receiver side using OFDM techniques.

DESCRIPTION OF THE INVENTION

Figure 1:
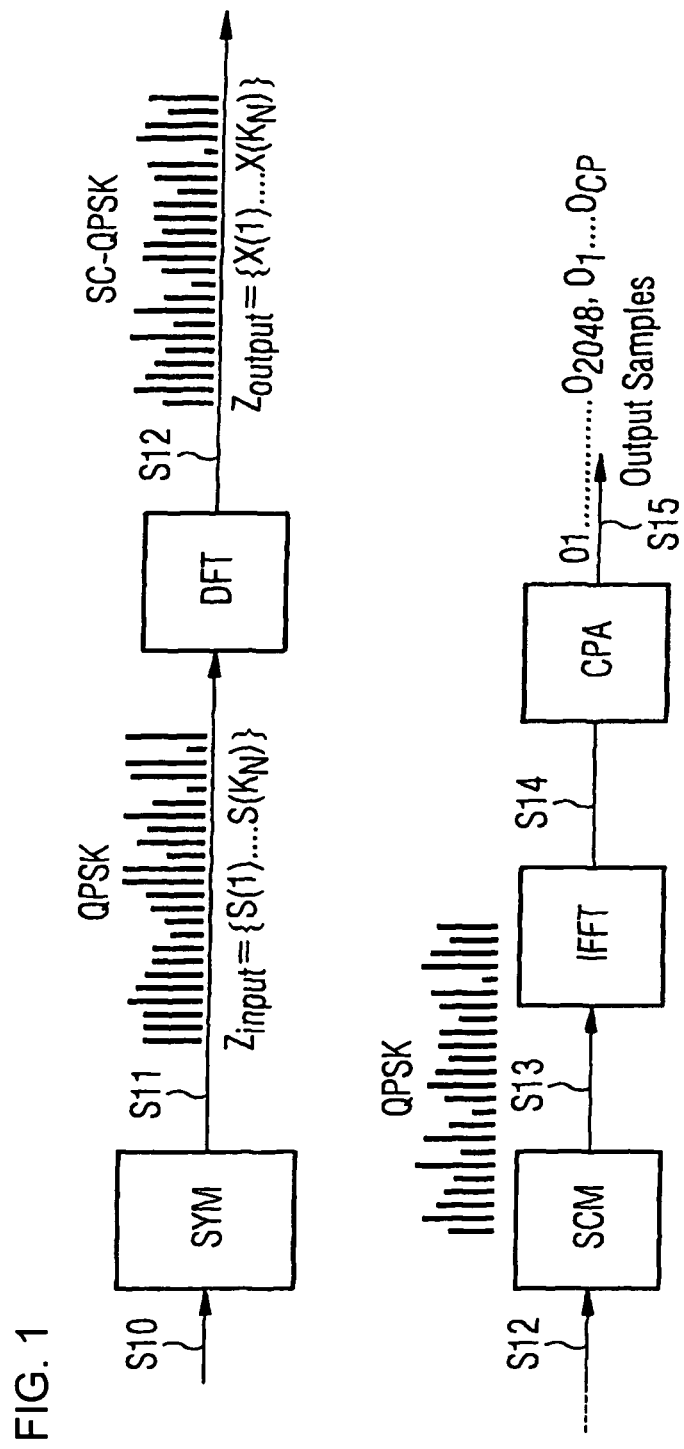
FIG. 1 is a block diagram schematically illustrating an example transmitter structure using the above mentioned SC-FDMA scheme with cyclic prefix.
Figure 2:
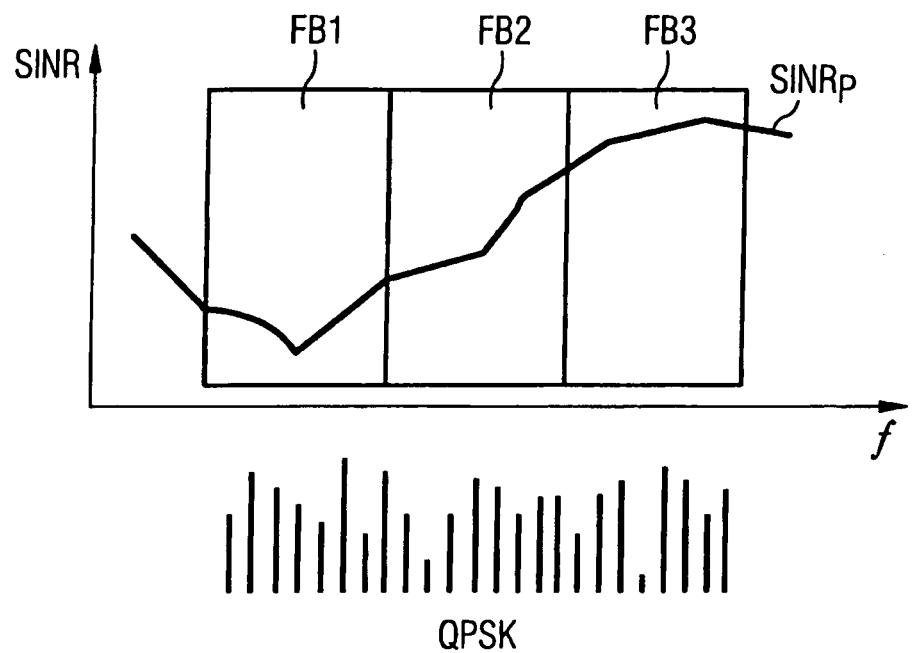
FIG. 2 is a graph schematically illustrating an example SINR plot in the frequency band of transmission for the example transmitter of FIG. 1.

In FIG. 1, input data signal SIO is coded and modulated into QPSK $K_N$ symbols SII via a modulation and coding module SYM. In the example of FIG. 1 and FIG. 2, a Quadrature Phase Shift Keying (QPSK) modulation is assumed which satisfies a desired BER target at the given SINR. The data symbol signal SII is transformed via a Discrete Fourier Transform (DFT) module DFT, of size $K_N$, into $K_N$ DFT pre-coded samples of data signal S12 in the frequency domain, in the following also denoted as f-domain. The DFT pre-coded data signal S12 is then mapped onto certain frequency resources in the frequency spectrum via a sub-carrier mapping module SCM into a mapped signal S13, in a localized mapping mode. In the given examples localized mapping was chosen. The frequency mapped signal S13 is transformed via an IFFT module IFFT, which may typically be of bigger size than the DFT size $K_N$, e.g. the IFFT size of the example is 2048, to a time-domain signal S14. The time-domain signal S14 is extended with a cyclic extension by a Cyclic Prefix addition module CPA into output samples=0i, . . . , O2048/Oi, . . . , Ocp so as to obtain transmission signal S15.

FIG. 2 depicts an example SINR plot for the example transmitter structure of FIG. 1, where the blocks FBI, FB2, FB3 denote frequency blocks of adjacent sub-carriers each.

The SINR represents the Signal to Interference plus Noise Ratio which, differently than the Signal-to-Noise ratio (SNR), includes also the co-channel interference from other users or sources. The SINR determines the final achievable throughput, per subcarrier or resource block, while the SNR gives a measure of the channel frequency response including the frequency selectivity of the transmission channel between the UE and the base station.

In the context of this description, the SINR is taken as a measure of the overall channel quality seen at the decision unit at the receiver which does demodulation and decoding. Other forms of channel quality measures may be the estimate of frequency channel transfer function, measuring the received signal from each transmit antenna to each receive antenna in the f-domain, or the estimate of Signal-to-Noise Ratio in the f-domain at the receiver including a specific structure, e.g. SISO, MRC, MIMO, and any other estimate which allows a suitable measure of the channel quality in the f-domain.

The SNR can be calculated for a given MIMO detector from the channel transfer function and the measured noise at the receiver antennas. Then, typically, via a look up table the appropriate AMC scheme is chosen according to the desired BER level. In an interference limited environment, the SINR is a better measure to determine the choice of the AMC level.

FIG. 2 depicts an example SINR plot SINRp, where the y-axis represents the achieved SINR at receiver and the x-axis f represents the frequency or the subcarrier numbers.

As shown in FIG. 2, the frequency band used for transmission is composed of three frequency or sub-carriers sub-bands FBI, FB2, FB3 in which, due to the different values of the SINR graph SINRp, the chosen QPSK modulation at a fixed code rate shows different qualitative behavior considered the SINR for the concerned sub-carriers.

For example, in the lower frequency sub-band FBI, the QPSK modulation is too high considered the sub-carrier SINR, meaning that the first frequency sub-band FBI is overloaded in terms of supportable rate at these resources, thus causing a BER degradation after the IDFT.

In the middle frequency sub-band FB2, the QPSK modulation matches the sub-carrier SINR for the given BER target, thus obtaining a full water-filling gain. In the upper frequency sub-band FB3, the QPSK modulation is too low considered the sub-carrier SINR, thus causing a throughput loss. Hence, the example graph of FIG. 2 illustrates the drawbacks of having the same modulation technique, e.g. QPSK in this case, over the whole range of sub-carriers f of the frequency band for the allocated transmission.

Figure 3:
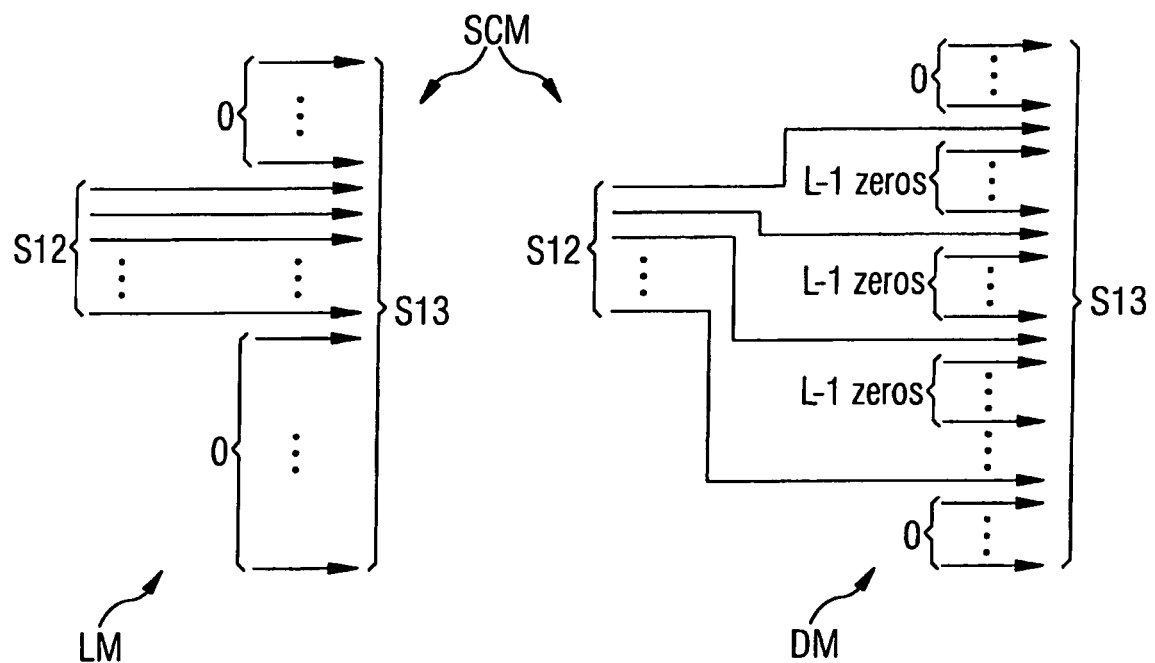

FIG. 3 is a schematic illustration of the operations performed on the DFT pre-coded signal S12 by the sub-carrier mapping module SCM whose task is to determine which part of the frequency spectrum is used for transmission. In the localized mapping scheme LM, illustrated in the left-side of FIG. 3, the DFT-pre-coded data signal S12 is mapped on to adjacent sub-carriers and zeros are inserted on all remaining unused sub-carriers.

In the distributed mapping scheme DM, illustrated in the right-side of FIG. 3, between each sample of the DFT-pre-coded data signal S12 L-I zeros are inserted. A mapping with L=I corresponds to the localized mapping scheme LM, whereas a mapping with L>1 correspond to the distributed mapping scheme DM, which is typically seen as a complement to the localized mapping scheme LM for providing additional frequency diversity, if the channel quality is either not known or can not be predicted.

In the example depicted in FIG. 1 the sub-carrier mapping module SCM performs a localized mapping scheme LM as it is performed in a classical prior art approach with a single DFT of size $K_n$ in order to obtain a SC-like signal which is somewhere localized in the f-domain allowing FDMA.

It is known that SC-FDMA systems may have the advantage of having a transmitted signal S15 with a low PAPR, assuming appropriate signal shaping, which allows less backoff at the transmitter power amplifier and therefore increases the average transmit power, thus improving the SINR and the coverage range. In fact, by using the DFT pre-coding module DFT and some appropriate pulse-shaping/filtering modules, not shown here, the resulting transmission signal S15 is very similar, as regards the signal envelop, to a single carrier (SC) signal which has a significantly lower PAPR than an OFDM signal using the same number of sub-carriers.

Advantageously, a transmission signal S15 with low PAPR allows the transmitter to use a significantly smaller backoff at the power amplifier, thus resulting in an improved link budget and in a greater coverage range. From information theory, it is well known that for slowly varying MIMO-channel conditions, channel adaptive bit-loading, using AMC coding combined with an MMSE receiver and successive interference cancellation is a transmission strategy which achieves capacity at high SNR.

Furthermore, it is also well known that in case that each transmitter has only one antenna per User Equipment (UE) a virtual MIMO system can be formed by treating several single transmitter antennas together as the channel inputs and the receiver antennas, e.g. at the Node B, as multi-antenna channel output.

Conveniently, these simultaneously transmitted signals using the same frequency resources can be separated, when sufficient synchronization is provided, into the spatial domain by a joint base band signal processing of all received signals at the receiver.

In general, an important advantage of multiple antennas at one UE is that such UE is able to use these antennas jointly for transmit beam-forming, thus enlarging the coverage range significantly. This advantage is greatly favored by cell edge UEs suffering from a high pathloss.

When experiencing less pathloss, e.g. a UE close to the base station, then multiple antennas may be used for the so called
spatial multiplexing in which the UE transmits several independent data streams to the base station in the same frequency resources using multiple antennas.

In particular, as regards SC-FDMA schemes, another important advantage of multiple antennas is that a UE with several antennas has the capability to transmit different SC-FDMA signals from each transmit antenna at different frequency resources, FDMA, each adapted to the best part of the spectrum of each antenna and thus gaining in throughput without an increase in PAPR.

This advantage is especially favored by UEs experiencing better SINRs, e.g. UEs close to the Node B, since only these UEs are able to use more bandwidth for transmission so that channel adapted transmission can achieve higher gains.

However, there are cases in which the spatial domain is saturated, as for example when a full spatial multiplexing on all allocated frequency resources is already applied or when the channel suffers from rank degradation.

Nevertheless, even in these cases where no further spatial multiplexing can be exploited to increase user throughput, another way of increasing user throughput is to increase the transmission bandwidth, provided that the limited total transmit power can support such bandwidth increase per time slot. In these cases, the classical way of allocating more sub-carriers per UE is utilized with the consequent disadvantages of reduced spectral efficiency.

In fact, the rational behind the use of SC-FDMA schemes for uplink transmission is to reduce PAPR by using DFT pre-coding
at the transmitter side and, thus, to increase the final SINR. But, when the bandwidth per user is increased, the SC-like signal, which uses a constant modulation and coding scheme before the DFT coding and which is spread over all allocated OFDM sub-carriers, is mostly at risk of being mapped into sub-carriers suffering from an extremely variable pathloss or from an extremely variable final SINR at the detector, thus causing spectral inefficiencies.

The spectral inefficiencies are a consequence of the fact that, the wider the allocated bandwidth, the harder it becomes to match the frequency selectivity of the post-detector SINR with a single modulation and coding scheme without significant loss in throughput.

The gains of AMC per chunk or resource block can not be exploited to the same extend, regarding granularity, as in the OFDM downlink.

Currently in 3GPP-LTE forums, an uplink transmission structure as the exemplary one depicted in FIGS. 1 and 2 is under discussion, with a single DFT of size $K_N$ with a localized mode LM as one mapping option. As seen in FIG. 1, in the uplink transmit structure, there is a single DFT-precoded signal S12.

Such known structure is particularly advantageous for PAPR reduction of low rate users with poor channel conditions, where the link budget is limited due to limited transmit power per UE and where a high PAPR requires a high backoff at the transmitter in order to guarantee linear behavior of the power amplifier.

However, with this known transmitter structure, even if high-rate users are able to use more bandwidth by supporting several basic resource units at the same time due to their more relaxed link budget, they are limited by the constraint that these resources have to be over consecutive basic resource units since all resources have to be allocated to adjacent resource units in the localized mode LM.

High rate users are typically the users closer to the base station. In fact, for high-rate users, the average pathloss is generally smaller, disregarding shadowing effects, than for cell edge users and therefore the power budget of the user, assuming a fixed maximum of transmit power per UE in order to guarantee long operation on battery, allows the allocation of more sub-carriers and higher order modulation schemes.

Thus, the known transmitter structure has the major drawback of not exploiting the capabilities of high-rate users of transmitting over more bandwidth. This is due to the fact that, although a UE might be close to the base station and although only a few active users might be active in the cell, the frequency selective transmission channel may have deep notches in the channel transfer function. If a deep fade
(notch) is included into the allocated sub-carriers, then the depth of this fade limits the overall achievable link quality with SC-FDMA transmission, if sufficient sub-carriers experience reduced SINR.

Thus, this known technique has the major drawback of being heavily limited by SNR-degraded parts of the allocated frequency spectrum since it is such degraded SNR-parts that determine the choice of the AMC scheme to be used for the entire allocated frequency resource-band of such UE transmitter.

As seen, there is a need in the art, for a technique capable of excluding, from the allocated transmission frequency spectrum, part of the spectrum in which the channel quality is poor.

Therefore, it would be advantageous to provide a technique which enables a frequency selective choice of the AMC by allowing a greater adaptive allocation of frequency resources depending on the measured channel quality.

Accordingly, the present invention relates to a method and a system for transmitting data by a transmitter over a channel having a predetermined channel quality estimate, the invention comprising: a) splitting input data stream to be transmitted into a plurality of data sub-streams; b) processing each of the plurality of data sub-streams into a plurality of symbol subsets by selecting a certain scheme of coded-modulation; c) processing, separately, each of the plurality of symbol subsets, via a plurality of separate Discrete Fourier Transforms, herein after denoted as DFTs, to obtain a plurality of DFT-precoded data sub-streams; d) allocating each DFT-precoded data sub-stream in a frequency resource block, via a sub-carrier mapping module, so that for each data sub-stream the selected scheme of coded-modulation is chosen in dependence of the values of the channel quality estimate at the frequencies of its own allocated frequency resource block.

In the invention embodiments, the scheme of coded-modulation may preferably be selected from the group consisting of:
coded-modulation scheme obtained by varying the modulation at a given coding;
coded-modulation scheme obtained by varying the coding at a given modulation;
coded-modulation scheme obtained by varying both modulation and coding.

In the invention embodiments, the allocated frequency resource blocks may conveniently be mapped to one or more transmit antennas, which may be either real or virtual.

In the invention embodiments, the sub-carrier mapping module may advantageously combine the plurality of the allocated resource blocks together into one frequency mapped signal by performing a localized frequency resource allocation mode so that the frequency resource blocks are adjacent to each other.

In the invention embodiments, the sub-carrier mapping module may conveniently combine the plurality of the allocated resource blocks together into one frequency mapped signal (S67) in a distributed way so that the frequency resource blocks are allocated in selected positions in the available frequency spectrum.

In the invention embodiments, each splitted data sub-stream may preferably be transmitted by a different transmitter antenna and each DFT-precoded data sub-stream may be separately mapped by the sub-carrier mapping module in a localized frequency resource allocation mode.

In the invention embodiments, each splitted data sub-stream may advantageously be transmitted by a different virtual transmitter antenna and each DFT-precoded data sub-stream is separately mapped by the sub-carrier mapping module in a localized frequency resource allocation mode.

In the invention embodiments, the predetermined channel quality estimate may be selected from the group consisting of:
estimate of channel frequency transfer function;
estimate of Signal-to-Noise Ratio in frequency domain at the receiver;
estimate of Signal to Interference plus Noise Ratio in frequency domain at the receiver.

In the invention embodiments, the better the channel quality estimate at the frequencies of the allocated frequency resource block, the higher may conveniently be the chosen scheme of coded-modulation.

In the invention embodiments, the data may be transmitted in uplink within a cellular telecommunication system.

In the invention embodiments, the transmitter is experiencing good channel quality and/or may be located in the proximity of a base station of a cellular telecommunication system.

In the invention embodiments, a receiver of the transmitted data may advantageously perceive the received data as being transmitted by a plurality of virtual users, each virtual user being associated with at least one frequency resource blocks wherein each frequency resource block is precoded by a separate DFT module.

The embodiments according to the proposed invention allow the presence of user equipments that are not limited to transmit exclusively with adjacent frequency resource blocks in a localized mode.

The UE behaves, from a frequency spectrum point of view, like multiple UEs transmitting independent DFT-precoded data sub-streams separated in the frequency domain (FDMA). By doing so, each DFT-precoded sub-stream can use a separate and independent AMC scheme and at least in partial independent power control as long as the available total transmit power budget per UE terminal is not exceeded.

From, a network point of view, the proposed method can be seen as the result of a transmission of different "virtual users". Each "virtual user" is associated to an independent frequency block, which is jointly precoded by one DFT.

Advantageously, each "virtual user" can support independent QoS classes, thus allowing different AMC scheme allocations for different QoS classes.

In the embodiments allowing a multi-antenna virtual multiuser approach, there is the possibility of having several SC-signals transmitted from different transmitter antennas, occupying more sub-carriers in the transmit spectrum than each transmitter alone, without loosing the desirable PAPR gains.

With the proposed embodiments, when sub-carriers, on which the DFT precoded signal is mapped, experience a significant variability of the pathloss or of the final SINR at the detector, the transmission of separately DFT precoded signals allows an adaptation to the variation of SINR and therefore gains from this flexibility.

The proposed embodiments, by enabling channel adaptive resource allocation with scalable granularity, increase spectral efficiency and throughput, thus reducing outage probability.

The proposed embodiments allows user equipments to trade gains from channel adaptive transmission against reduced transmit power without violating the standardized SC-FDMA scheme. In fact, the receiver is able to decode each DFT precoded sub-stream separately with an appropriate IDFT after the spatial separation.

The proposed embodiments are particularly beneficial to UEs experiencing good channel conditions, e.g. the UEs located in the proximity of Node B, since such UEs are permitted to transmit with higher PAPRs due to their higher remaining transmit power within their power budget.

The proposed embodiments also enable independent support of different services with different QoS requirements. In fact, for example, a VoIP stream, requiring a high QoS in terms of acceptable latency, can be mapped to a frequency resource block with a good channel transfer function, i.e. to a spectral sub-portion where the effective SINR is relatively high. Instead, a Best-Effort Service stream, targeting for more bandwidth, can be mapped to a frequency resource block with a poorer channel transfer function, relying on the additional HARQ and ARQ schemes in case of needed retransmissions, i.e. therefore such services to a spectral sub-portion where the effective SINR is lower or subject to for variability.

The proposed embodiments are compatible to the known standardized SC-FDMA scheme.

In fact, since the known techniques for uplink transmission in the 3GPP-LTE implement a DFT precoding and a mapping to adjacent resources in the localized mode LM, this is guaranteed by the proposed embodiments by using several DFTs and by having a user which transmits at several adjacent resource blocks, behaving like several virtual users.

Advantageously, the proposed embodiments can be enabled and/or disabled in telecommunication systems either by the user equipment, i.e. UE capability class, or by the base station, Node B capability class, or by a network controller, i.e network management capability class.

The proposed embodiments are compatible with a receiver having only one antenna, since the transmitting UE is perceived as several UEs, separated by DFTs according to the SC-FDMA approach.

The proposed embodiments allow, in the multi-carrier SC-FDMA schema, the allocation of remaining spectral resources which may be available in other parts of the spectrum and which are not adjacent to the other frequency resources for the transmitting user.

The proposed embodiments allow splitting of a transmitter signal streams into several SC-FDMA sub-streams positioned outside of the notch possibly present in a channel transfer function, thus achieving a significant higher throughput.

Figure 4A:
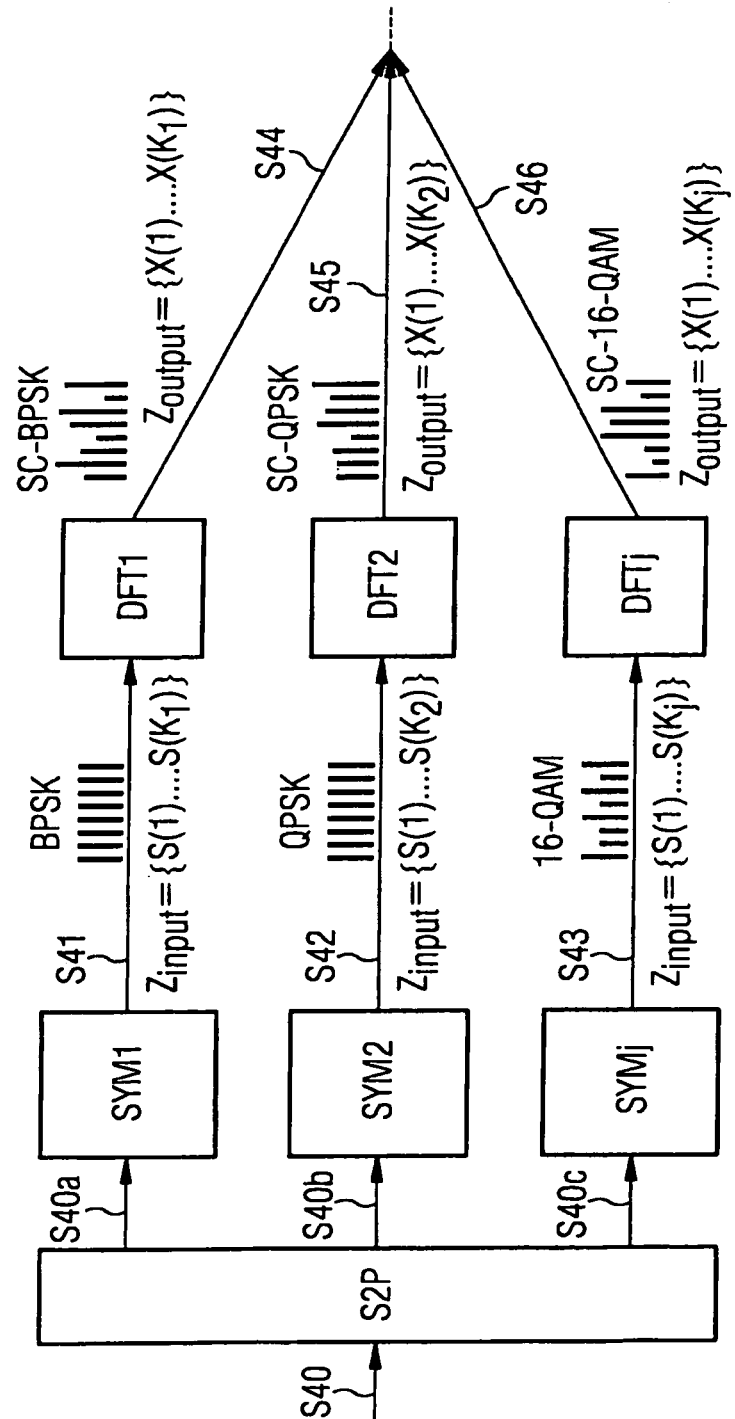
Figure 4B:
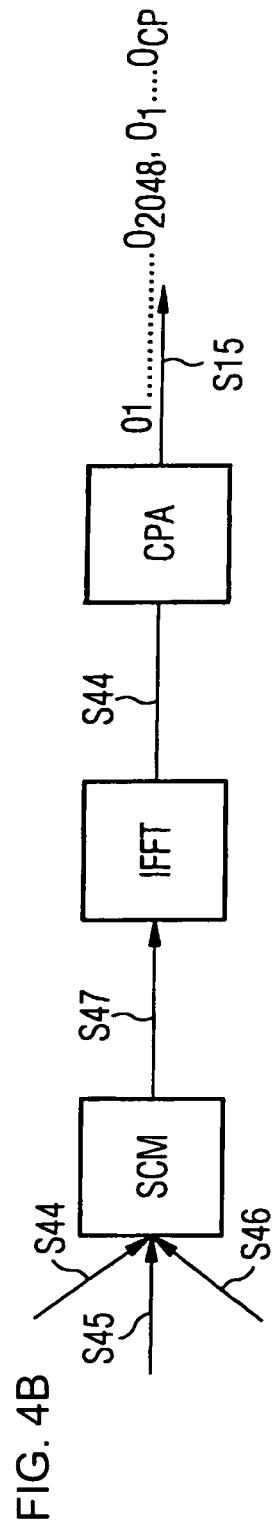
Figure 5:
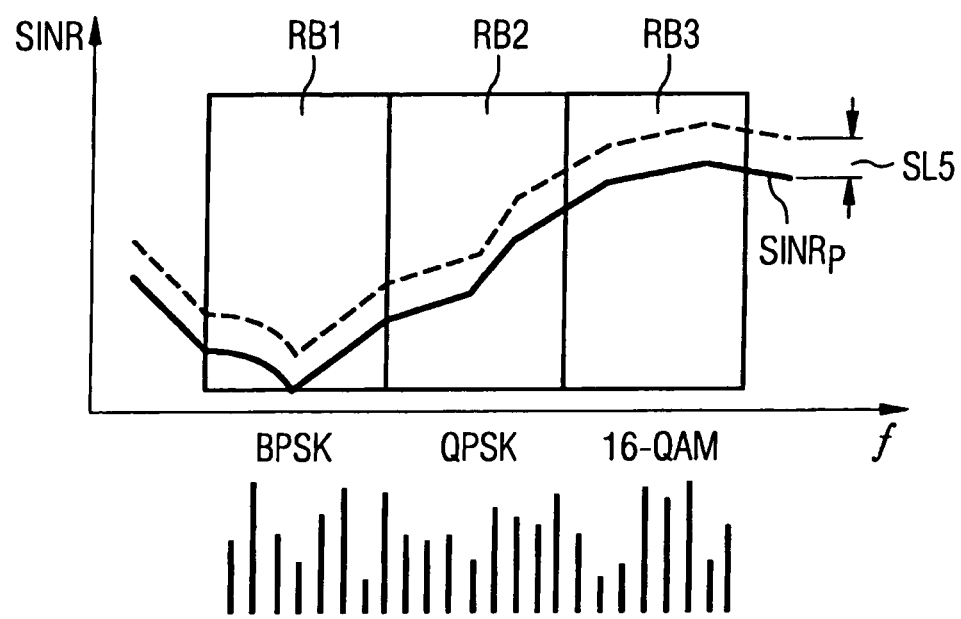
Figure 6A:
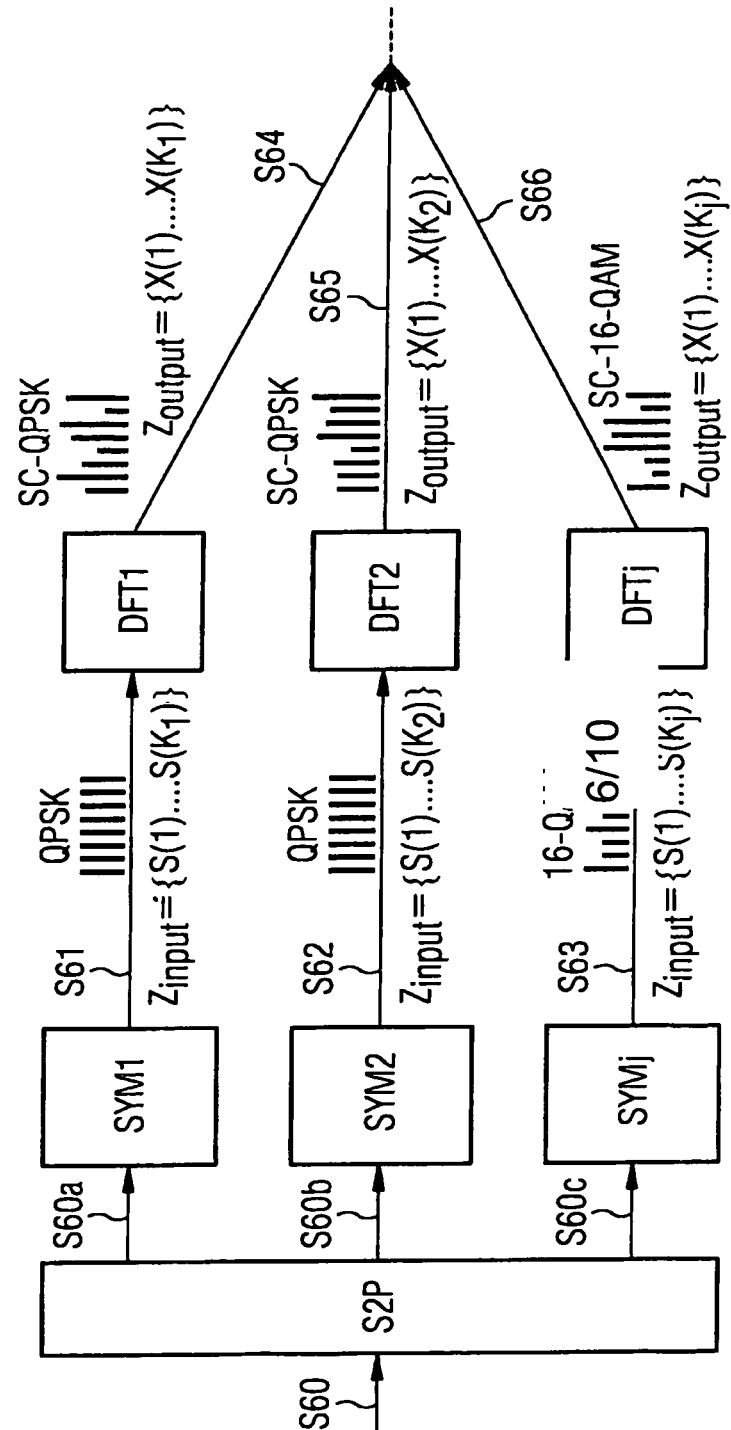
Figure 6B:
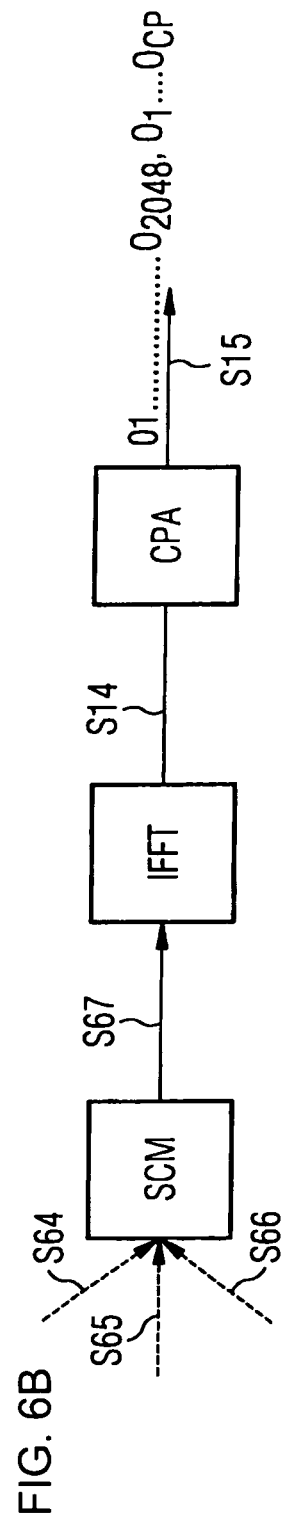
Figure 7:
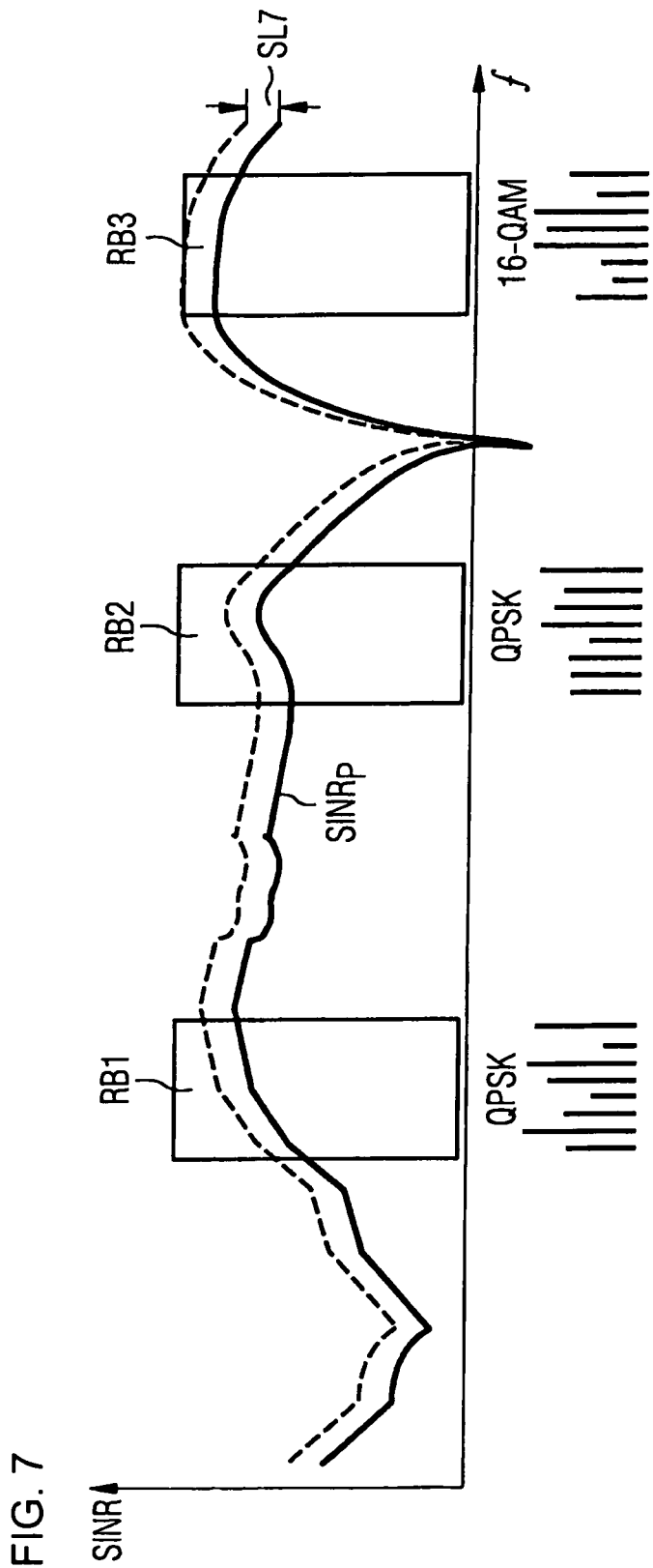
Figure 8A:
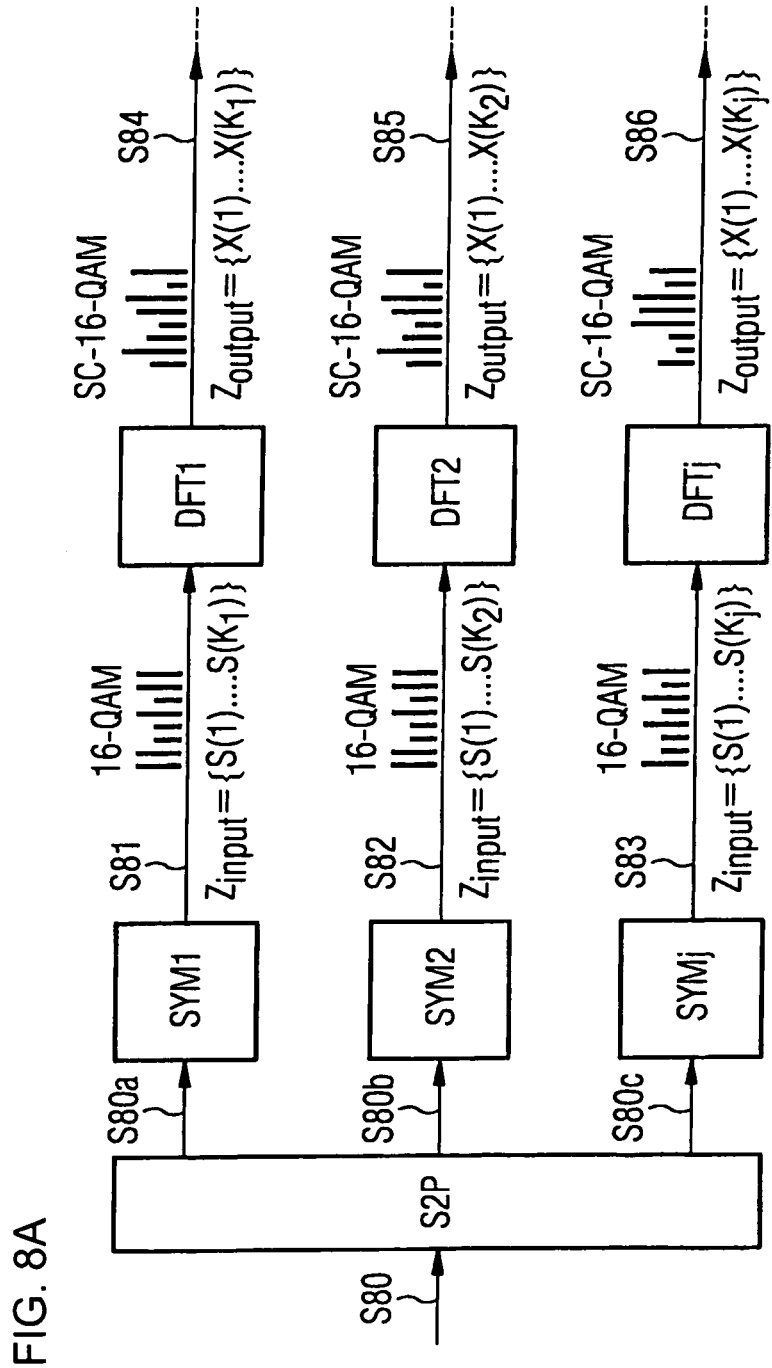
Figure 8B:
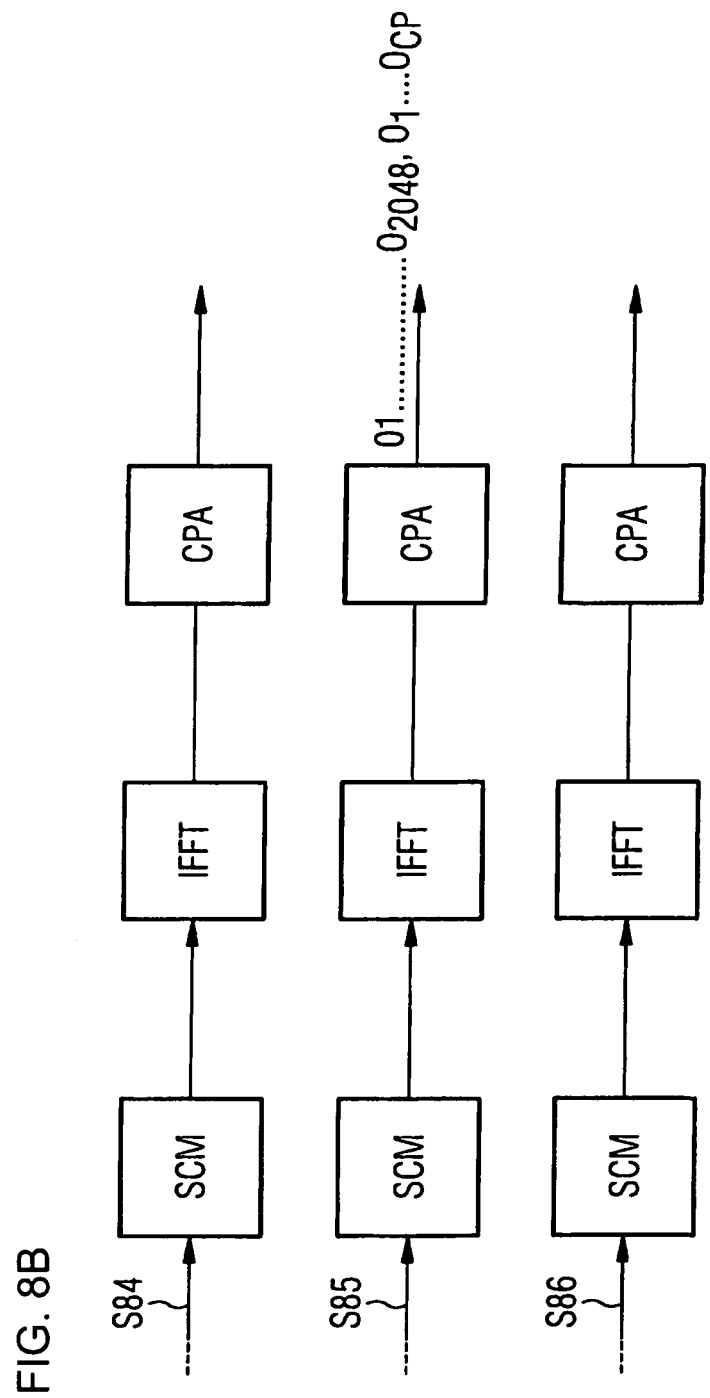
Figure 9:
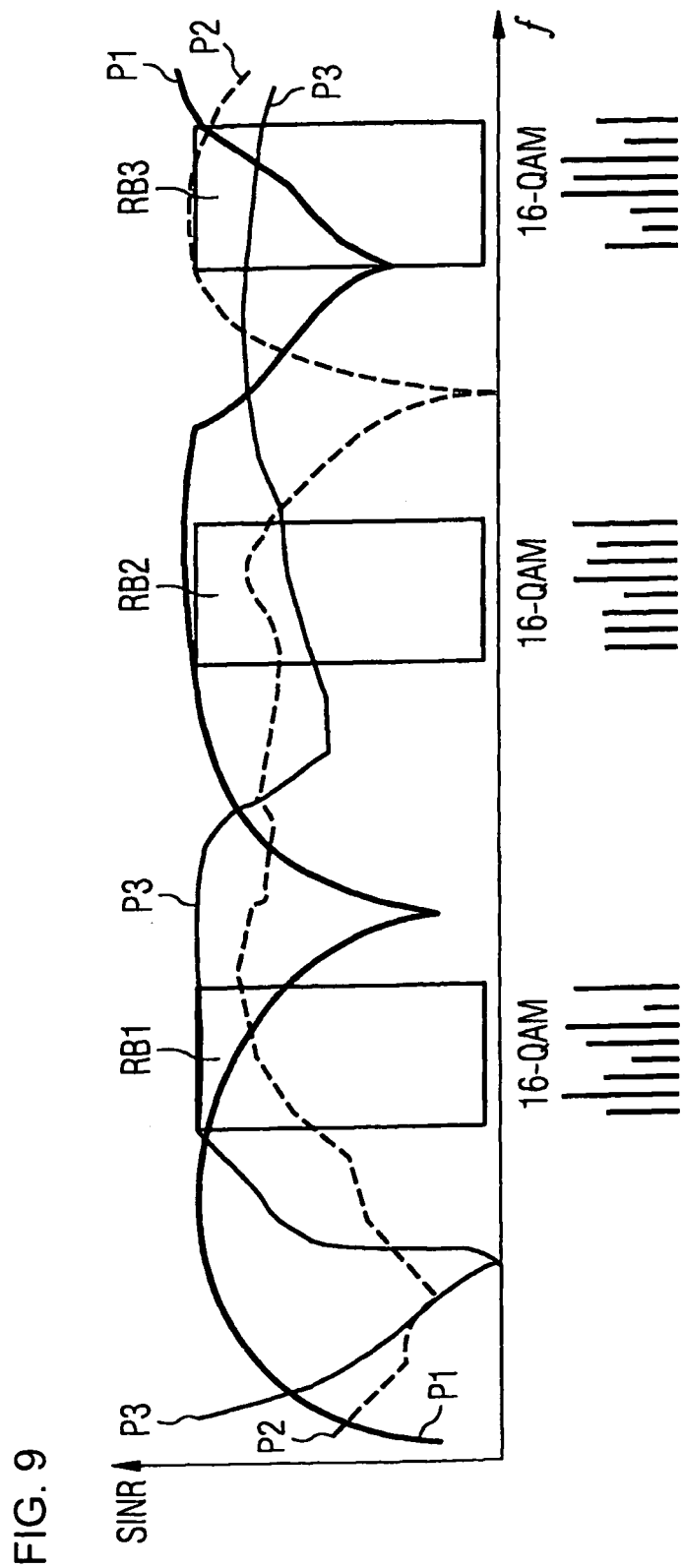

The invention will now be described in preferred but not exclusive embodiments with reference to the accompanying drawings, wherein:

FIG. 1 is a block diagram schematically illustrating an example transmitter structure (Prior Art);

FIG. 2 is a graph schematically illustrating a channel quality estimate plot for the example transmitter of FIG. 1 (Prior Art);

FIG. 3 is a schematic illustration of the operations of the sub-carrier mapping module (Prior Art);

FIG. 4 is a block diagram schematically illustrating an example transmitter structure according to a first embodiment of the present invention;

FIG. 5 is a graph schematically illustrating an example channel quality estimate for the example transmission of FIG. 4;

FIG. 6 is a block diagram schematically illustrating an example transmitter structure according to a second embodiment of the present invention;

FIG. 7 is a graph schematically illustrating an example a channel quality estimate for the example transmitter of FIG. 6;

FIG. 8 is a block diagram schematically illustrating an example transmitter structure according to a third embodiment of the present invention;

FIG. 9 is a graph schematically illustrating an example SINR plot for the example transmitter of FIG. 8.

FIGS. 1, 2 and 3 have already been described in previous sections.

FIG. 4, composed of FIGS. 4*a* and 4*b*, is a block diagram schematically illustrating an example transmitter structure according to a first embodiment of the present invention.

Input data signal S40 is splitted into three input data sub-streams S40*a*, S40*b*, S40*c* by a serial to parallel module S2P. Each of the plurality of data sub-streams S40*a*, S40*b*, S40*c* is individually coded and modulated by the modules SYMI, SYM2, SIMj, into a data symbol subset stream S41, S42, S43 by selecting, for each individual data sub-stream S40*a*, S40*b*, S40*c*, the ad-hoc level of AMC scheme BPSK, QPSK, 16-QAM as herein-after described. In the context of this invention, with the terms "AMC scheme" or "coded-modulation scheme" it is intended a scheme obtained by varying one or both of the modulation, e.g. BPSK, QPSK, 16-QAM, and of the coding, e.g. convolutional coding, Reed-Solomon coding or Turbo coding with variable code rates e.g. 1/6, 1/3, 12/2/3, $H_1$ 8/9. The achieved throughput or rate depends on the combination of the two, i.e. the modulation and the coding. For simplicity reasons, in the following examples only the modulation BPSK, QPSK, 16-QAM is varied and the coding is considered given. However the skilled in the art easily understands that in further embodiments according to the present invention, also the coding may vary alone or in combination with the modulation.

Each data symbol subset stream S41, S42, S43 is processed individually by DFT module DFI, DF2, DFTj of a certain size $K_1$, $K_2$, $K_j$ so as to obtain a plurality of DFT-precoded data sub-streams S44, S45, S46.

All the DFT-precoded data sub-streams S44, S45, S46 are combined together in the frequency domain at the input of the IFFT, each one in an allocated frequency resource block RBI, RB2, RB3 without frequency overlap, via the sub-carrier mapping module SCM into a frequency mapped signal S47.

In FIG. 4, the subsequent processing performed by the IFFT module IFFT and by the CPA module CPA is the same as the processing above described for FIG. 1.

In FIGS. 4 and 5, the allocation of each frequency resource block RBI, RB2, RB5 is performed by the sub-carrier mapper SCM so that, for each data sub stream S40*a*, S40*b*, S40*c*, the selected level of modulation scheme BPSK, QPSK, 16-QAM fits at best the SINR level of the frequency resource block RBI, RB2, RB3 of each of the input sub-streams S40*a*, S40*b*, S40*c*. The sub-carrier mapper SCM is working in a generalized localized mode so that the different frequency resource blocks RBI, RB2, RB3 are adjacent to each other (see FIG. 5).

As illustrated in FIG. 5, the optimal modulation and coding is selected in dependence of the achievable SINR at the receiver at the allocated frequency resource block RBI, RB2, RB3.

A frequency resource block RBI, RB2, RB3 is a set of predefined sub-carriers which is treated as one resource and jointly allocated to one user. A frequency resource block RBI, RB2, RB3 may preferably be composed by a small number of adjacent sub-carriers but also may be composed by any possible distribution of subcarriers among the total available subcarriers. In this way, providing the small number of adjacent subcarrier a similar SINR, they can be treated by the resource scheduler as a single resource with a similar channel quality in order to reduce the amount of feedback for the sub-carrier allocation. In LTE systems, a unit composed of e.g. 12 or 25 sub-carriers is typically treated as a single frequency resource block.

As shown in FIG. 4*a*, each input sub-stream S40*a*, S40*b*, S40*c* may have a different modulation schema, e.g. the first input sub-stream S40*a* has a BPSK modulation schema, the second input sub-stream S40*b* has a QPSK modulation schema and the third input sub-stream S40*c* has a 16-QAM modulation schema. In fact, each modulation schema is optimized in dependency of the SINR frequency transfer function of the specific SINR region as shown in FIG. 5.

The continuous line of FIG. 5 shows an exemplary SINR plot SINRp for the example transmitter of FIG. 4. From FIG. 5 it is seen that the SINR curve SINRp of the first resource block RBI is poor so that a lower modulation level such as a BPSK modulation is preferably chosen. Instead, the SINR curve SINRp of the third resource block RB2 is good so that a higher modulation level such as a 16-QAM modulation is preferably chosen. While, the SINR curve SINRp of the second resource block RB2 is at a medium level so that a middle modulation level such as QPSK represents the preferred match.

In FIG. 5, the dashed line shows the SINR plot obtained with a transmitter having a single DFT module DFT, as in the prior-art example of FIG. 1. The level difference SL5 of the SINR plot SINRp between the continuous and dashed line is a result of the increased PAPR.

FIG. 6, composed of FIGS. 6a and 6b, is a block diagram schematically illustrating an example transmitter structure according to a second embodiment of the present invention.

Input data signal S60 is splitted into three input data sub-streams S60a, S60b, S60c by the serial to parallel module S2P. Each of the plurality of data sub-streams S60a, S60b, S60c is individually modulated and coded, by the modules SYMI, SYM2, and SYMj, into a data symbol subset stream S61, S62, S63 by selecting, for each individual data sub-stream S60a, S60b, S60c, the ad-hoc level of AMC scheme QPSK, QPSK, 16-QAM.

Each data symbol subset stream S61, S62, S63 is processed individually by DFT module DFI, DF2, DFTj of a certain size Ki, K2, Kj so as to obtain a plurality of DFT-precoded data sub-streams S64, S65, S66.

All the DFT-precoded data sub-streams S64, S65, S66 are combined together in the frequency domain at the input of the IFFT, each one in an allocated frequency resource block RBI, RB2, RB3, via the sub-carrier mapping module SCM into a frequency mapped signal S67.

Also in FIG. 6b, the subsequent processing performed by the IFFT module IFFT and by the CPA module CPA is the same as the processing above described for FIG. 1.

In FIGS. 6 and 7, the allocation of each frequency resource block RBI, RB2, RB5 is performed by the sub-carrier mapper SCM so that, for each data sub stream S60a, S60b, S60c, the selected level of modulation scheme QPSK, QPSK, 16-QAM fits at best the channel quality level at the frequencies of the frequency resource block RBI, RB2, RB3 of each of the input sub-streams S40a, S40b, S40c. The sub-carrier mapper SCM is working in a generalized distributed way so that the different frequency resource blocks RBI, RB2, RB3 are allocated at conveniently selected positions within the available frequency spectrum (see FIG. 7). The distributed allocation way of this embodiment, differently than the prior art distributed mode DM depicted in FIG. 3, means that the positions of the frequency resource blocks RBI, RB2, RB3 are freely chosen in the available frequency spectrum and need not to be limited to equidistant positions as it is instead the case of the distributed mode DM of FIG. 3 of the prior art.

The resource frequency blocks RBI, RB2, RB3 are preferably located in the frequencies where the SINR plot has higher levels and are mapped in localized mode for each RB. Again, as explained in the description of the first embodiment, the optimal coding and modulation scheme is selected in dependence of the achievable SINR at the receiver at the allocated frequency resource block RBI, RB2, RB3.

Similarly as for FIG. 5, the level difference SL7 of the SINR plot SINRp between the continuous and dashed line is a result of the increased PAPR.

Both embodiments of the proposed multi-carrier SC-FDMA transmission schemes exploit the benefits of being able to perform adaptive transmission over the frequency selective channel, thus allowing throughput gains in frequency selective channels, by allowing an adaptation of the AMC scheme to the post detector SNR.

The first embodiment has the additional advantage that the subcarrier module SCM, by performing a localized resource allocation LM, keeps a reduced PAPR notwithstanding the PAPR degradation SL5 caused by the use of several DFT modules DFTI, DFT2, DFT3.

The second embodiment has the additional advantage that the resource blocks RBI, RB2, RB3 can be positioned anywhere within the available entire transmission bandwidth, thus allowing a more flexible radio resource management and also gaining in diversity against co-channel interference from neighboring cells.

FIG. 8, composed of FIGS. 8a and 8b, is a block diagram schematically illustrating an example transmitter structure according to a third embodiment of the present invention.

The transmitter of FIG. 8 is a multiple-antenna transmitter, i.e. the UE transmitter is able to transmit with different antennas, e.g. in the scenario of FIG. 6 there are 3 transmitter antennas.

Input data signal S80 is splitted into three input data sub-streams S80a, S80b, S80c by the serial to parallel module S2P. Each of the plurality of data sub-streams S80a, S80b, S80c is individually modulated and coded, by the modules SYMI, SYM2, SYMj, into a data symbol subset stream S81, S82, S83 by selecting, for each individual data sub-stream S80a, S80b, S80c, using the same ad-hoc level of AMC scheme 16-QAM for all three antennas.

Each data symbol subset stream S81, S82, S83 is processed individually by DFT module DFI, DF2, DFTj of a certain size Ki, K2, Kj so as to obtain a plurality of DFT-precoded data sub-streams S84, S85, S86.

Each DFT-precoded data sub-stream S84, S85, S86 is independently and separately allocated in the frequency domain, in a frequency resource block RBI, RB2, RB3, via a sub-carrier mapping module SCM, into a frequency mapped signal.

Also in FIG. 8b, the subsequent processing, performed by the IFFT module IFFT and by the CPA module CPA is the same as the processing above described for FIG. 1.

In FIGS. 8 and 9, the allocation of each frequency resource block RBI, RB2, RB5 is performed by each of the sub-carrier mappers SCM so that, for each data sub stream S80a, S80b, S80c, the selected level of modulation scheme fits at best the channel quality level at the frequencies of the frequency resource block RBI, RB2, RB3 of each of the input sub-streams S40a, S40b, S40c. In particular, in the example of FIG. 9 the selected modulation scheme is 16-QAM for all the three frequency resource blocks RBI, RB2, RB3 because the related SINR plots PI, P2, P3, at the considered frequencies, allow that.

Each of sub-carrier mapping modules SCM is working in a localized mode LM because each of the different DFT precoded frequency resource blocks RBI, RB2, RB3 belongs to a different transmitter antenna. The resource frequency blocks. RBI, RB2, RB3 are preferably located in the bands where the SINR plots PI, P2, P3 have high levels. The optimal modulation and coding is selected in dependence of the achievable SINR at the receiver at the specific allocated frequency resource block RBI, RB2, RB3.

In FIG. 9, the three curves PI, P2, P3 represent the effective SINR achieved with the given receiver type from each of the three transmit antennas at the receiver antenna, assuming that the base station is having at least one receiver antenna. Typically, the resource allocation is determined by the channel quality between the transmitter-receiver antenna pairs. The allocated resource blocks are again on the peaks of each SINR curve PI, P2, P3 but, differently than in the previous two embodiments, in this third embodiment with a multiple-antenna scenario, each antenna is able to use maximum power per resource block RBI, RB2, RB3, since the PAPR for each transmitter is not altered. Moreover, in this third embodiment, no PAPR loss has to be paid, when each transmitter antenna is transmitting only one DFT-precoded signal S84, S85, S86. In fact, for each antenna, each DFT-precoded data sub-stream S84, S85, S86 is mapped onto adjacent sub-carriers in a localized mode LM, even if the total allocated resources RBI, RB2, RB3 are distributed over the spectrum. The scheduler assigns resources where the channel quality has maximum values and the SINR is maximum.

With this third embodiment, a single UE, having multiple transmitter antennas, is capable of benefiting from multi user diversity gains even if the Node B uses less receiver antennas than the UE uses transmitter antennas. Thus the UE having three transmitter antennas, is able to send three DFT precoded streams with optimum AMC at the optimum resources.

In summary, with the three proposed embodiments according to the present invention, a single UE transmits several DFT precoded frequency resource blocks RBI, RB2, RB3 within the total transmission spectrum and at the same time slot. Each of the allocated frequency resource block RBI, RB2, RB3 is DFT pre-code individually and it can use a separate, individual, ad-hoc AMC scheme.

The first two embodiments are best implemented for user equipments experiencing good channel conditions and could therefore allocate a wider bandwidth, i.e. many frequency resource blocks RBI, RB2, RB3 due to their relaxed link budget. Advantageously, the throughput gains from channel adaptive transmission in the frequency domain can be traded against the increase in PAPR, which is not a critical issue for these types of users.

Moreover, since these types of users are able to allocate additional frequency resources that need not to be consecutive, it results in a more flexible channel adaptive resource scheduling for the other users that are experiencing poor channel frequency estimates, e.g. users at the cell edge, which severely suffer from the exceeding link budget due to pathloss, shadowing and interference. The cell edge users by needing a connection over a long range, exploit mainly the benefits from a low PAPR with SC-transmission. The PAPR is especially low for low order modulations e.g. BPSK and QPSK, which fit well with the low SINR experienced of cell edge users. Users close to the base station which do not suffer from such a limited link budget as cell edge users do, might focus on the highest possible throughput, but e.g. higher order modulation alone will already increase the PAPR with SC-transmission.

The third embodiment can be implemented by users experiencing any type of channel condition, e.g. from low to high pathloss, since the reduced PAPR obtained with single-DFT pre-coding is maintained.

In all three illustrated examples, the sum over all Ki= Ki, ..., $K_j$ equals to $K_N$ of the example of the prior art transmitter.

The skilled person in the art easily understands that in further proposed embodiments according to the present invention, the input data signal may be splitted in any number different than three. Moreover, the level of modulation, in further embodiments, may be any other different that BPSK, QPSK, 16-QAM or 64-QAM.

Additionally, in further embodiments of multiple transmitter antennas, transmission schemes may be implemented in which at least one of the transmitter antennas is transmitting more than one DFT-precoded signal.

Another further embodiment may include the concept of virtual antennas of beam-forming. In this context, the so called "virtual antenna" is obtain when a signal to be transmitted is split up in several identical copies which are then transmitted coherently over several antennas including possible complex factors as multiplicative weights for each antenna. The radiation pattern transmitted from each antenna superimpose after transmission and since they are transmitted coherently will form a joint beam pattern which looks for an outside observer like a single antenna with a special radiation pattern (beam pattern).

Assuming K transmit antennas, it is possible to form up to K uncorrelated beam patterns which can then be treated as K virtual antennas, each one able to transmit an independent message into the air. If only one of the possible k virtual antennas is used then the power of the K transmit antennas can be coherently summed up to form a beam into a certain direction, e.g. a cell edge user can transmit his data into a direction which is received by the base station with a good SINR In summary, in the various embodiments of the present invention, the allocated frequency resource blocks (RBI, RB2, RB3) may be mapped to one or more real or virtual transmit antennas.

Without prejudice to the underlying principles of the invention, the details and the embodiments may vary, even appreciably, with reference to what has been described by way of example only, without departing from the scope of the invention as defined by the annexed claims.

Here-below follows some exemplary choices of strategy that can be implemented for users experiencing certain given conditions.

If a user is able to support only a few sub-carriers with a low order modulation, e.g. BPSK, QPSK, for example a cell user having a limited power budget, it is suggested to implement a transmitter with a single DFT-precoding with filtering/signal shaping, e.g. with root raised cosine filtering, to obtain a low PAPR with the SC-signal as known from prior art methods.

If a user is close to the base station and uses a small band, only a few adjacent resource blocks, with high modulation, e.g. 16 QAM or 64-QAM, it is suggested to implement a transmitter with DFT pre-coding but without spectral filtering in order to use more sub-carriers for data transmission. In fact, in this case, the slight increase in PAPR is compensated due to the more relaxed link budget (lower pathloss).

If a user which is experiencing good channel conditions, e.g. a user close to the base station, is able to use many adjacent resource blocks, then a suggested strategy is to implement the first embodiment of the present invention, with several DFT precoded streams without any filtering but exploiting the above mentioned advantages of frequency dependent adaptive modulation and coding.

If a user is close to the BS but no adjacent resource blocks are available, but resource blocks are left over somewhere in the spectrum, then a suggested strategy is to use the second embodiment of the present invention.

In order to exploit all those strategy modes, the user may be enabled to communicate that it is able to perform transmission with and w/o filtering and that it is able to support a virtual multi-user transmission scheme.

The advantages are a higher individual throughput for the user and more flexibility for the resource scheduler at the base station since the stringent requirement that all resources for one user have to be on adjacent sub-carriers in one time slot is not necessary anymore without loosing the advantages of SC-FDMA transmission.

LIST OF USED ACRONYMS

3GPP Third Generation Partnership Project
AMC Adaptive Modulation and Coding
ARQ Automatic Retransmission reQuest
BER Bit Error Rate CDMA Code division multiple access
DFT Discrete Fourier Transform
FDMA Frequency Division Multiple Access
HARQ Hybrid Acknowledged Retransmission reQuest
IFFT Inverse Fast Fourier Transform ISI Inter Symbol Interference
LTE Long Term Evolution
MIMO Multiple In Multiple Out
MMSE Minimum Mean Square Error
MRC Maximum Ratio Combining OFDM Orthogonal Frequency Division Multiplexing
PAPR Peak to Average Power Ratio
QoS Quality of Service
QPSK Quadrature Phase Shift Keying
RRM Radio Resource Management
SC-FDMA Single Carrier—Frequency Division Multiple Access
SIC Successive Interference Cancellation
SC Single Carrier
SINR Signal to Interference plus Noise Ratio
SNR Signal-to-Noise Ratio
UE User Equipment
UMTS Universal Mobile Telecommunications System
VoIP Voice over IP

The invention claimed is:

1. A method for transmitting data by a transmitter over a channel having a predetermined channel quality estimate, the method which comprises:
    splitting an input data stream to be transmitted into a plurality of data sub-streams;
    processing each of the plurality of data sub-streams into a plurality of symbol subsets by selecting a given scheme of coded-modulation;
    separately processing each of the plurality of symbol subsets via a plurality of separate Discrete Fourier Transforms DFTs, to obtain a plurality of DFT-precoded data sub-streams; and
    allocating each DFT-precoded data sub-stream in a frequency resource block, via a sub-carrier mapping module, to thereby choose for each data sub-stream the selected scheme of coded-modulation in dependence on values of the predetermined channel quality estimate at frequencies of the frequency resource block allocated for the respective data sub-stream.

2. The method according to claim 1, wherein the scheme of coded-modulation is selected from the group consisting of:
    coded-modulation scheme obtained by varying the modulation at a given coding;
    coded-modulation scheme obtained by varying the coding at a given modulation; and
    coded-modulation scheme obtained by varying both modulation and coding.

3. The method according to claim 1, which comprises mapping the allocated frequency resource blocks to one or more transmit antennas.

4. The method according to claim 3, wherein the transmit antennas are either real or virtual.

5. The method according to claim 1, which comprises combining, by the sub-carrier mapping module, the plurality of the allocated resource blocks together into one frequency mapped signal by performing a localized frequency resource allocation mode to place the frequency resource blocks adjacent to each other.

6. The method according to claim 1, which comprises combining, by the sub-carrier mapping module, the plurality of the allocated resource blocks together into one frequency mapped signal with a distribution having the frequency resource blocks allocated in selected positions in an available frequency spectrum.

7. The method according to claim 1, which comprises transmitting each splitted data sub-stream by a different transmitter antenna and separately mapping each DFT-precoded data sub-stream by the sub-carrier mapping module (SCM) in a localized frequency resource allocation mode.

8. The method according to claim 1, which comprises transmitting each splitted data sub-stream by a different virtual transmitter antenna and separately mapping each DFT-precoded data sub-stream by the sub-carrier mapping module in a localized frequency resource allocation mode.

9. The method according to claim 1, which comprises selecting the predetermined channel quality estimate from the following group:
    estimate of channel frequency transfer function;
    estimate of signal-to-noise ratio in frequency domain at the receiver; and
    estimate of signal to interference plus noise ratio in frequency domain at the receiver.

10. The method according to claim 1, wherein in allocating each DFT-precoded data sub-stream in a frequency resource block, the better the predetermined channel quality estimate of the frequency resource block allocated for the respective data sub-stream, the higher the throughput of the scheme of coded-modulation selected for the respective data sub-stream.

11. The method according to claim 1, which comprises transmitting the data in uplink within a cellular telecommunication system, and in which the selecting during processing each of the plurality of data sub-streams into a plurality of symbol subsets is ad hoc.

12. The method according to claim 1, wherein the transmitter is experiencing good channel quality.

13. The method according to claim 1, wherein the transmitter is located nearer to a base station than to a cell edge of a cellular telecommunication system.

14. The method according to claim 1, which comprises perceiving the transmitted data, on receipt of the received data by a receiver, as being transmitted by a plurality of virtual users, each virtual user being associated with at least one frequency resource block, and wherein each frequency resource block is precoded by a separate DFT module.

15. An apparatus comprising means for performing the steps of the method according to claim 1.

16. An apparatus for transmitting data over a channel having a predetermined channel quality estimate, the apparatus comprising:
    a serial to parallel module configured to split an input data stream to be transmitted into a plurality of data sub-streams;

a plurality of coding and modulating modules configured to process each of the plurality of data sub-streams into a plurality of symbol subsets by applying a given scheme of coded-modulation;

a plurality of discrete Fourier transform (DFT) modules configured to process each of the plurality of symbol subsets according to a DFT to obtain a plurality of DFT-precoded data sub-streams; and a sub-carrier mapping module configured to allocate each DFT-precoded data sub-stream in a frequency resource block, to thereby choose for each data sub-stream one of the given schemes of coded-modulation in dependence on values of the predetermined channel quality estimate at frequencies of the frequency resource block allocated for the respective data sub-stream.

17. The apparatus according to claim 16, wherein the scheme of coded-modulation is selected from the group consisting of:

coded-modulation scheme obtained by varying the modulation at a given coding;

coded-modulation scheme obtained by varying the coding at a given modulation; and coded-modulation scheme obtained by varying both modulation and coding.

18. The apparatus according to claim 16, in which the sub-carrier mapping module is configured to combine the plurality of the allocated resource blocks together into one frequency mapped signal by performing a localized frequency resource allocation mode to place the frequency resource blocks adjacent to each other.

19. The apparatus according to claim 16, in which the sub-carrier mapping module is configured to combine the plurality of the allocated resource blocks together into one frequency mapped signal with a distribution having the frequency resource blocks allocated in selected positions in an available frequency spectrum.

20. The apparatus according to claim 16, further comprising a transmitter configured to transmit each splitted data sub-stream by a different transmitter antenna;

and in which the sub-carrier mapping module is configured to separately map each DFT-precoded data sub-stream in a localized frequency resource allocation mode.

21. The apparatus according to claim 16, wherein the apparatus comprises a base station.

22. The apparatus according to claim 16, wherein the apparatus comprises a user equipment.

23. A computer program product comprising a non-transitory computer-readable storage medium bearing computer program code embodied therein for use with a computer, the computer program code comprising code for performing the method according to claim 1.

24. An apparatus comprising:

one or more processors; and one or more memories including computer program code, the one or more memories and the computer program code configured, with the one or more processors, to cause the apparatus to perform at least the following:

splitting an input data stream to be transmitted into a plurality of data sub-streams;

processing each of the plurality of data sub-streams into a plurality of symbol subsets by selecting a given scheme of coded-modulation;

separately processing each of the plurality of symbol subsets via a plurality of separate Discrete Fourier Transforms DFTs, to obtain a plurality of DFT-precoded data sub-streams; and allocating each DFT-precoded data sub-stream in a frequency resource block, via a sub-carrier mapping module, to thereby choose for each data sub-stream the selected scheme of coded-modulation in dependence on values of the predetermined channel quality estimate at frequencies of the frequency resource block allocated for the respective data sub-stream.

* * * * *

UNITED STATES PATENT AND TRADEMARK OFFICE
CERTIFICATE OF CORRECTION

Page 1 of 1

PATENT NO. : 8,605,664 B2
APPLICATION NO. : 12/517152
DATED : December 10, 2013
INVENTOR(S) : Josef Martin Eichinger et al.

It is certified that error appears in the above-identified patent and that said Letters Patent is hereby corrected as shown below:

On the Title Page

Page 1, Column 1, Item (75): Please delete "Bernard" and replace with --Bernhard--.

Signed and Sealed this
Twenty-eighth Day of October, 2014

Michelle K. Lee
*Deputy Director of the United States Patent and Trademark Office*